June 2, 1931. H. O. LOCH ET AL 1,808,361
STORAGE BATTERY CONNECTER
Filed May 27, 1926 2 Sheets-Sheet 1

Inventors,
Herman Otto Loch, John Ross Miller
and Edward Alden Tibbals
By their Atty.

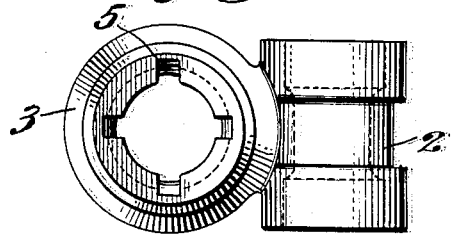
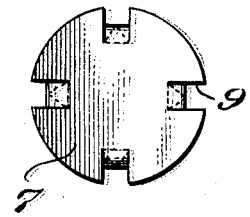
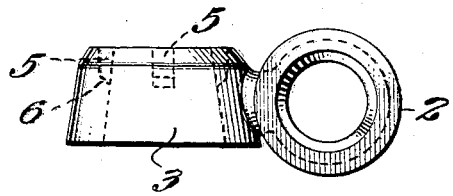
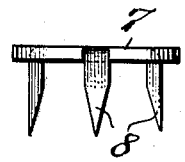
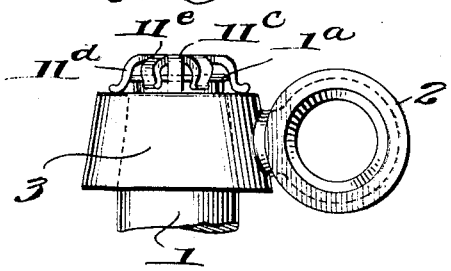
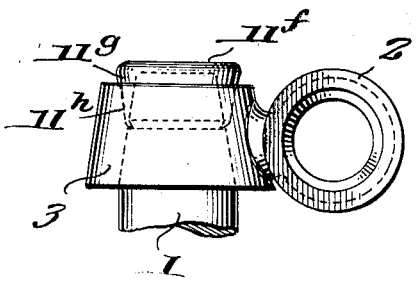

Patented June 2, 1931

1,808,361

UNITED STATES PATENT OFFICE

HERMAN OTTO LOCH AND JOHN ROSS MILLER, OF WASHINGTON, DISTRICT OF COLUMBIA, AND EDWARD ALDEN TIBBALS, OF BETHESDA, MARYLAND

STORAGE BATTERY CONNECTER

Application filed May 27, 1926. Serial No. 112,000.

This invention relates to an improved terminal or connecter for attaching the leads to a storage battery, particularly such as is used on automobiles and other vehicles for starting, ignition, and lighting purposes.

Connecters for storage batteries commonly employ a conductor terminal sleeve provided with a split ring having a clamping bolt and adapted to receive the battery post. The bolt is employed to draw together the parts of the ring, to thereby clamp the ring around the post.

A storage battery such as is commonly used on automobiles has a tendency to corrode its connecters due to creepage of the exciting liquid and, unless the posts are kept clean and greased, this corrosion tends to make the bolt and nut solid with the sleeve and to prevent the sleeve from being opened except by the use of special tools. This results in expense and service when it is necessary to remove the connecters to enable the battery to be recharged, or to remove the battery from its holder.

Furthermore, when a considerable effort is required to remove the old type of connecter, excessive strains are put on the battery post, tending to cause cell-covers and jars to crack, plates to break off of their straps, separators to be punctured, post seals to leak, and the entire cell to be disturbed, all of which is detrimental to efficient functioning of the battery.

In the split ring or sleeve connecter now in common use even though no corrosion is present, the lateral extension of the ears of the ring and the position of the bolt and nut, not only causes interference with the removal of the vent or filler caps, but these caps, in turn, are so located that they interfere with the application of tools to draw up the nut on the bolt or to release it.

The foregoing, and other, disadvantages inhering in the split ring, nut and bolt type of battery connecter now in common use, have led us to devising the present improved connecter whose object is to provide improved means whereby the connecter may be quickly and easily applied to the battery post, will be securely held in position, may be readily removed when desired without possibility of injuring the battery in any manner, and will be so compact that there will be no interference with vent or filler caps when our connecter is applied to, or removed from, the battery post.

Our improved connecter is devoid of any split ring or nut and bolt or screw arrangement and has no laterally projecting part to bring about the difficulties and disadvantages characteristic of the common connecter, hereinbefore referred to. Our improved connecter requires no special tools for its application to the post or its removal therefrom.

Any suitable tool by which a light tap or blow may be given to the improved locking device of our connecter for the purpose of securing the connecter on the post, is all that is necessary. On the other hand, any tool of the screw driver type, or even a handle of a pair of pliers, is all that is necessary for the purpose of prying off the locking device when it is desired to remove the connecter from the battery post. As the operation of applying the connecter to the battery post is a vertical movement and the removal of the device is effected by a vertical movement, as distinguished from a horizontal movement, such as is necessary with the split ring, bolt and nut type of connecter, there is naturally no interference with the vent or filler cap nor any strain on the battery, nor are there any objections that can be raised to the use of our connecter.

We are aware that the principle of our invention may be carried out in other forms than those which are illustrated in the accompanying drawings and hereinafter described and we do not, therefore, limit the invention to the particular embodiment illustrated.

Our invention has for its principle the provision of a ring, preferably continuous, to which the terminal sleeve for the wire or conductor is attached, the ring being adapted to fit over the battery post, combined with a locking member, preferably in the form of a cap, having one or more prongs, or formed as a wall, said locking member constituting the means for securing the ring to the battery post.

In its preferred embodiments, the locking member or cap and the ring are so constructed that they are adapted to cooperate to effect a clinching action between the locking member or cap and the battery post to insure against accidental detachment of the locking member or cap due to vibration or other causes.

In the accompanying drawings:

Figure 6 is a plan view of the connecter of Figures 1, 2 and 3 by itself;

Figure 7 is a side elevation thereof;

Figure 8 is a side elevation of another modification shown in position on the battery post;

Figure 9 is a plan view of the locking member or cap used with the embodiment shown in Figures 1, 2 and 3;

Figure 10 is a side elevation thereof; and

Figure 11 is a side elevation of another modification shown in position on a battery post.

Figure 1:
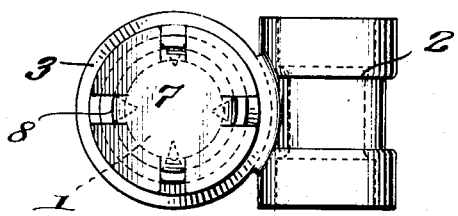
Figure 1 is a plan view showing the connecter on a battery post.
Figure 3:
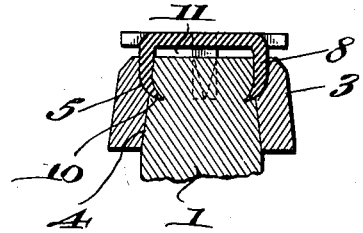
Figure 3 is a vertical section.
Figure 2:
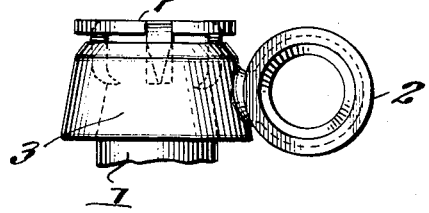
Figure 2 is a side elevation thereof, the battery post being broken away.

Referring first to Figures 1, 2 and 3, the battery post is shown at 1, illustration of the battery being omitted.

The sleeve to which the end of the conductor is fastened in a manner well known in battery connecter construction, appears at 2, the conductor being omitted.

Instead of providing a split ring with a clamping bolt and nut, we provide a continuous ring 3 which is preferably of brass, lead-coated, said ring being formed integral with the sleeve 2, or permanently connected to it. The interior of the ring 3 is tapered as shown at 4, Figure 3, so that it will fit the tapered part of the battery post 1.

The ring 3 is provided with one or more grooves, channels, or guide-ways 5 as shown most clearly in Figures 3, 6 and 7, said channels or guide-ways being tapered and provided at their lower parts with more or less abruptly inclined parts 6 although it will be understood that the inner face of the groove may be a straight incline or curved.

The sleeve 2 instead of being arranged in a horizontal plane, may be inclined in relation to the ring 3 so that there will even be more clearance in respect to the conductor and said sleeve.

The locking device is shown in detail in Figs. 9 and 10 and comprises, as shown, a cap of brass, lead-coated, 7 which is provided with one or more prongs 8. As shown, there are four prongs which are formed by striking them up from the metal of which the cap is made as, for instance, by slashing the edge of the cap at 9. The prongs 8 correspond in number and spacing to the grooves or channels 5. Preferably, there will be provided a plurality of these prongs but it is within the spirit of the invention to use but a single prong. The prong or prongs constitute a wedge or wedges which are made to clinch the battery post 1 in the manner shown in Figure 3 when the cap is driven down into position to secure the ring 3 in position.

Assuming that the ring 3 has been pressed down on the post 1 so that it encircles it, the cap 7 which is then in the condition shown in Figs. 9 and 10, is applied by first inserting the tips of the prongs 8 into the groove 5. A light tapping action applied to the cap 7 will then force the cap downwardly and will result in the grooves 5 and parts 6 turning the ends of the prongs inwardly to effect the clinching action shown in Fig. 3 where the inturned points appear at 10. The post 1 being of lead, it is readily penetrated by the points 10. When in its assembled position, the cap 7 lies slightly above the upper end of the battery post, thus leaving a space 11 which is sufficient to admit the tip of a screw driver or even the end of a handle of a pair of pliers, or any convenient appliance, even a wire nail that may be used to pry off the cap when it is desired to remove the connecter.

Figure 4:
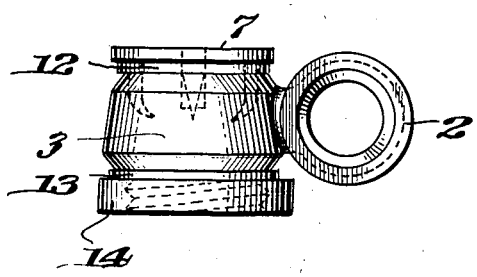
Figure 4 is a side elevation of a modification.

In Fig. 4 the same features are found as heretofore described but there is illustrated an upper soft rubber gasket 12 and a lower gasket 13 which prevent the creepage of the acid solution and thus minimize danger of corrosion. In this form we have shown the invention applied to a battery which has a boss 14 on its top but the post 1 is used as usual.

Figure 5:
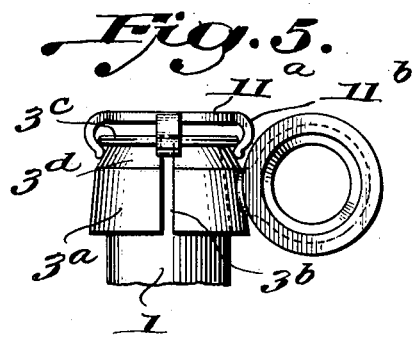
Figure 5 is a similar view of another modification shown in position on the battery post.

In Fig. 5 the ring 3a is split as shown at 3b and has a tapered interior fitting the post 1. The upper end of the ring 3a is provided with a bead 3c and a bevel 3d. The cap 11a has fingers 11b which snap over the bead 3c and by their resiliency hold the ring 3a clamped on the post 1.

In the modification shown in Figure 8, the battery post appears at 1 and is formed with a bead 1a on its upper end. The ring 3 and sleeve 2 are of the same general construction shown in Figures 1, 2 and 3 but the ring is not provided with the internal grooves 5. The cap 11c is provided with fingers 11d which are adapted to press against the upper edge of the ring 3 and it has shorter fingers 11e which are resilient and engage the bead 1a in the manner previously described. The result is that a downward pressure is exerted on the ring 3 to hold said ring on the battery post.

In the modification shown in Figure 11, the battery post appears at 1, the ring at 3 and the terminal sleeve is shown at 2. The cap 11f has a tapered wall 11g which is adapted to engage a tapered concavity 11h in the ring 3 so that when the cap is driven down it will be forced into the battery post and effect a clinching action.

When the cap of either Fig. 1, Fig. 4 or Fig. 11 is forced into position, it causes clean lead of the battery post 1 around the terminal or connecter, making a superior electrical contact.

What we claim is:

1. In a storage battery connecter, a ring provided with means for connection to a conductor, said ring being adapted to be placed around the battery post, and an independent locking cap adapted to overlie the end of the battery post and having an elongated downward extension adapted to be driven between the ring and the battery post by blows applied to said cap after the ring has been thus placed, for the purpose of locking said ring and post together.

2. In a storage battery connecter, a ring provided with means for connection to a conductor, said ring being adapted to receive the battery post, and a cap surmounting the ring and post, said cap being provided with prongs adapted to be entered between the ring and post for the purpose of locking them together.

3. In a storage battery connecter, a ring provided with means for connection to a conductor, said ring being adapted to receive the battery post and having channels in its inner face or bore, and a locking cap provided with prongs which are adapted to enter the channels and by the latter to be made to clinch with the battery post.

4. In a storage battery connecter, a ring provided with means for connection to a conductor, said ring being adapted to be placed around the battery post, and a locking cap adapted to overlie the end of the battery post and having an integral elongated downwardly projecting prong adapted to be driven, by blows applied to the cap, between the ring and the battery post after the ring has been thus placed, for the purpose of locking said ring and post together.

In testimony whereof we affix our signatures.

HERMAN OTTO LOCH.
JOHN ROSS MILLER.
EDWARD ALDEN TIBBALS.